United States Patent [19]

Beth et al.

[11] Patent Number: 5,074,081
[45] Date of Patent: Dec. 24, 1991

[54] SANDER WITH REMOVABLE AUXILIARY HANDLE

[75] Inventors: David E. Beth, Easley, S.C.; James B. Watson, Conyers, Ga.

[73] Assignee: Ryobi Motor Products Corp., Pickens, S.C.

[21] Appl. No.: 713,502

[22] Filed: Jun. 12, 1991

[51] Int. Cl.$^5$ ............................................. B24B 23/00
[52] U.S. Cl. ................................. 51/170 R; 403/381
[58] Field of Search ......... 51/170 MT, 170 T, 170 R, 51/170 TL, 170 EB; 16/114 R; 403/17, 381, 345, DIG. 4

[56] References Cited

U.S. PATENT DOCUMENTS

| 119,815 | 10/1871 | Brintzinghoffer | 403/381 |
|---|---|---|---|
| 2,721,427 | 10/1955 | Dremel | 51/170 MT |
| 3,336,703 | 8/1967 | Multer | 51/170 MT |
| 3,803,773 | 4/1974 | Odawara et al. | 51/170 TL |
| 3,854,897 | 12/1974 | Attinger | 51/170 TL |
| 4,900,090 | 2/1990 | Davis | 403/381 |

FOREIGN PATENT DOCUMENTS 0232783 4/1925 United Kingdom ................ 403/381

Primary Examiner—Roscoe V. Parker
Attorney, Agent, or Firm—David L. Davis

[57] ABSTRACT

A sander with a removable auxiliary handle. The auxiliary handle is formed from three pieces (two mirror image body halves and a resilient latching finger) and slides and snaps onto grooves molded as part of the front end of the sander housing.

7 Claims, 5 Drawing Sheets

SANDER WITH REMOVABLE AUXILIARY HANDLE

BACKGROUND OF THE INVENTION

This invention relates to powered sanding tools and, more particularly, to such a tool with a removable auxiliary handle.

Power sanders typically include a movable platen on which is secured a sheet of abrasive material. The platen is below a main housing portion of the sander which contains a motor coupled to the platen for effecting movement thereof. A main handle portion is typically provided, connected to and extending rearwardly from the main housing portion. In order that the tool operator have maximum control over the sander, there is often provided a secondary, or auxiliary, handle either connected to, or formed as part of, the main housing portion and extending forwardly therefrom.

When the sander has a relatively large platen, the main housing portion of the sander takes up a relatively small portion of the area of the platen and therefore the auxiliary handle remains within the contours of a vertical projection of the platen. However, in a sander where the platen is small and the main housing portion takes up a relatively large percentage of the area of the platen, the auxiliary handle may extend beyond the contour of a vertical projection of the platen. When sanding a board or some other surface which is not bounded by walls this does not ordinarily present a problem. However, when sanding a surface bounded by walls, if the auxiliary handle extends beyond the platen, this limits the extent to which sanding in a corner of the surface may be effected. Removal of the auxiliary handle in such a situation would greatly enhance the effectiveness of the sanding process.

It is therefore a primary object of the present invention to provide an auxiliary handle for a sander which is readily removable.

It is another object of the present invention to provide such an auxiliary handle which, when installed on the sander, blends in with the overall contours of the sander to provide an aesthetically pleasing appearance.

SUMMARY OF THE INVENTION

The foregoing, and additional, objects are attained in accordance with the principles of this invention by providing a sander of the type described wherein the main housing portion is formed with a pair of parallel and oppositely directed grooves and the auxiliary handle is formed with a pair of parallel flanges adapted to each slide in a respective one of the grooves.

In accordance with an aspect of this invention, the main housing portion is formed with a flat plate member forwardly of and parallel to the grooves and the auxiliary handle includes means for resiliently engaging the plate member when the flanges slide a predetermined distance along the grooves.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 1:
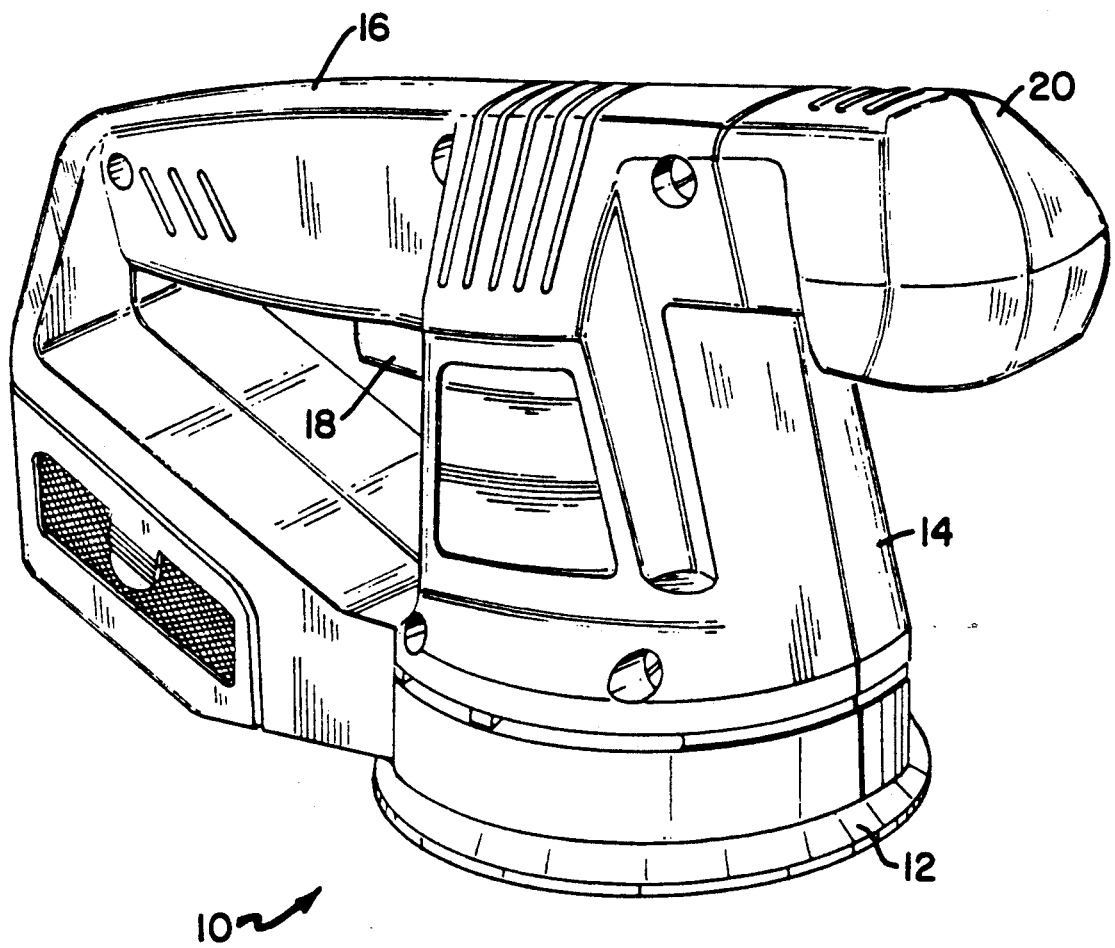
FIG. 1 is a perspective view of a sander constructed according to this invention.

Referring now to the drawings, FIG. 1 illustrates a sander, designated generally by the reference numeral 10, constructed according to this invention. The sander 10 includes a movable platen 12 adapted to support a sheet of abrasive material in a manner well known in the art. Above the platen 12, the sander includes a main housing portion 14 within which is contained a motor (not shown) which is coupled to move the platen 12 in a manner well known in the art. The sander 10 also includes a main handle portion 16 extending from the main housing portion 14 rearwardly beyond the platen 12. The handle portion 16 illustratively includes a trigger switch 18 by means of which the tool operator can selectively supply power to the motor.

Figure 2:
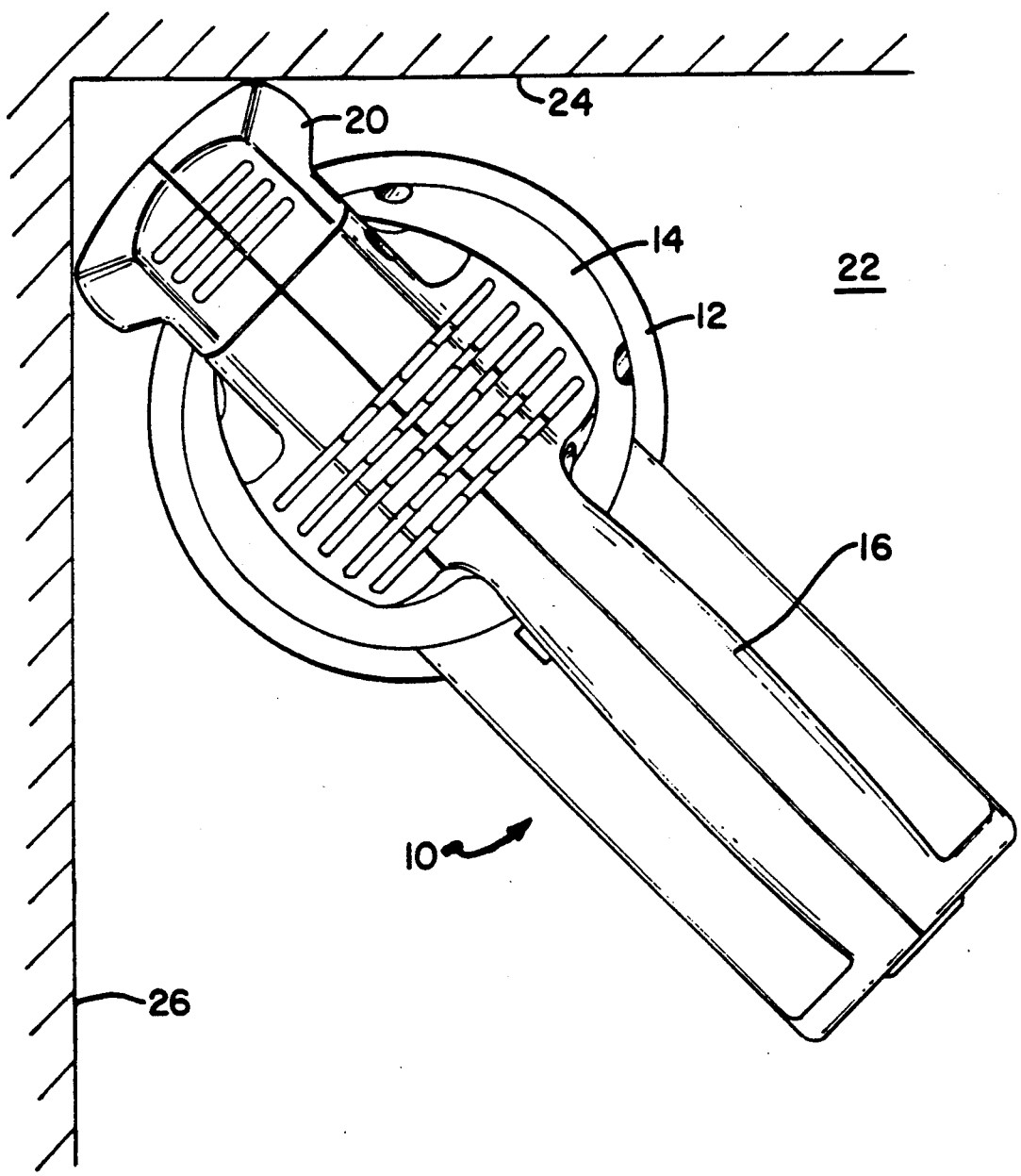
FIG. 2 is a top plan view of the sander shown in FIG. 1 in operation near a bounded corner of a surface being sanded.
Figure 3:
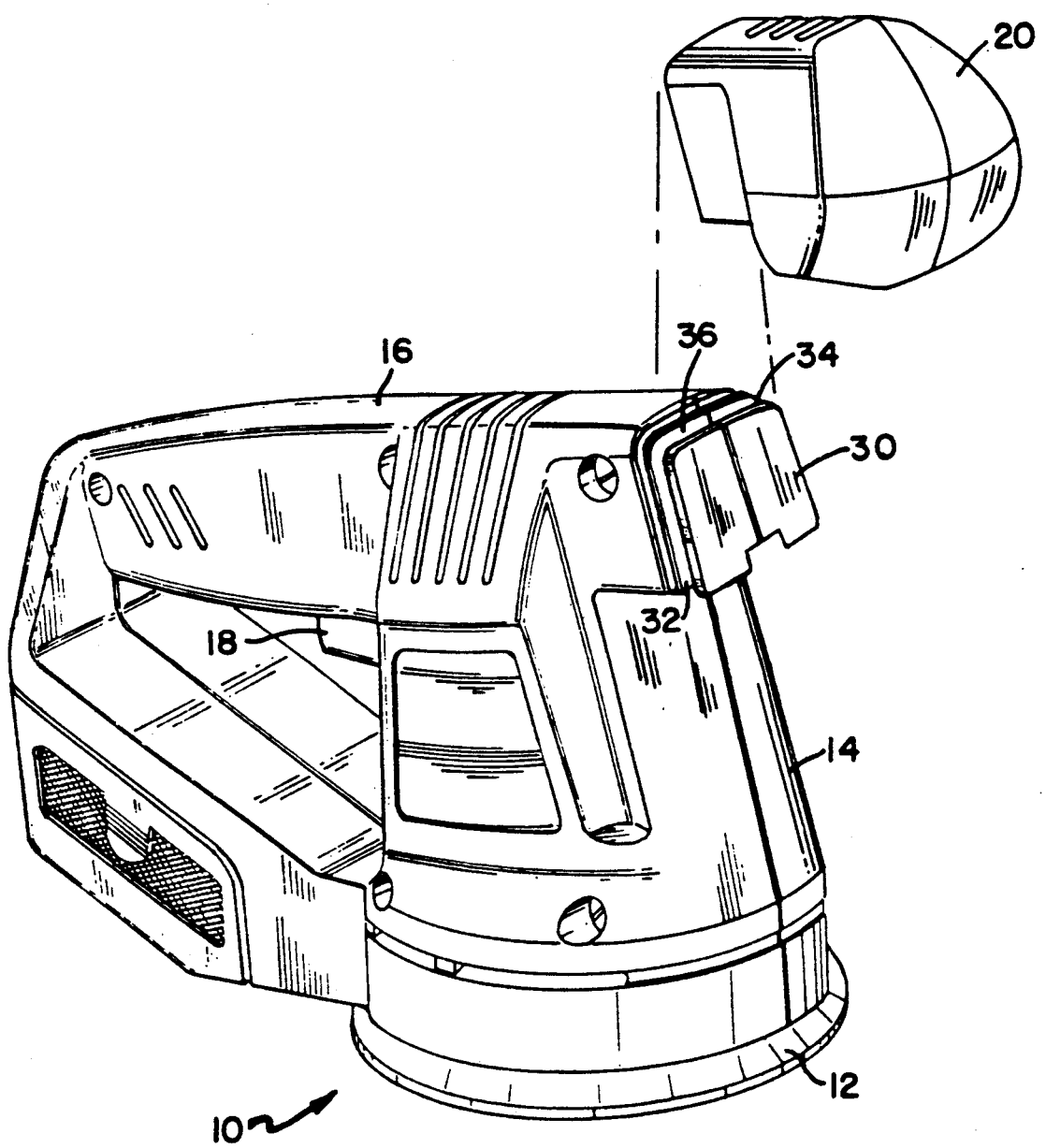
FIG. 3 shows the sander of FIG. 1 with the auxiliary handle removed and spaced therefrom.
Figure 4:
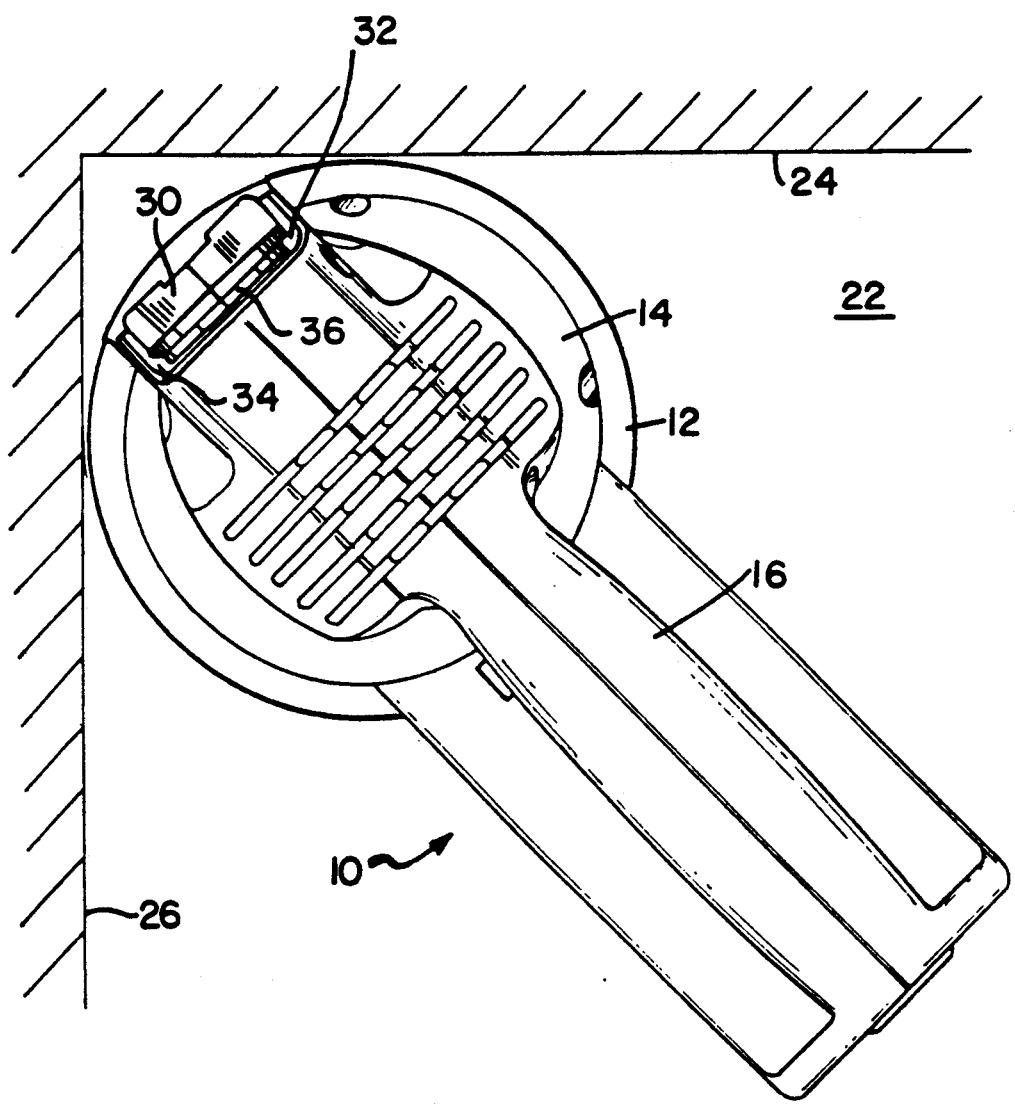
FIG. 4 is a view similar to FIG. 2 showing the sander in position near a bounded corner with the auxiliary handle removed.
Figure 5:
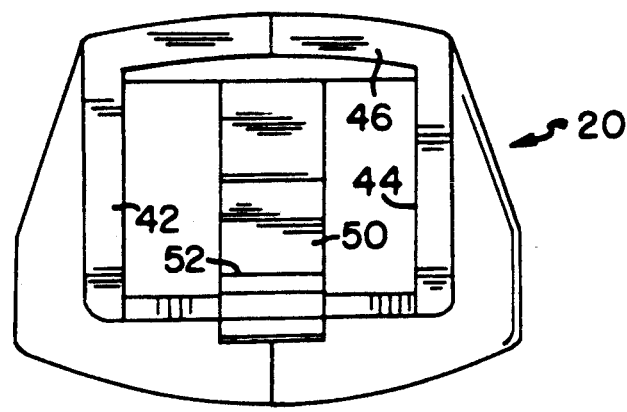
FIG. 5 is a view of the rear of the auxiliary handle.

According to this invention, the sander 10 is provided with an auxiliary handle 20 which is removably secured to the main housing portion 14 and extends forwardly therefrom beyond the platen 12. FIG. 2 illustrates the situation where the sander 10, having the auxiliary handle 20 installed thereon, is being utilized to sand a surface 22 bounded by the walls 24 and 26. It is noted that when it is desired to sand in the corner defined by the juncture of the walls 24 and 26, the auxiliary handle 20 interferes with the platen 12 getting into the corner region. FIG. 3 illustrates the removal of the auxiliary handle 20 from the sander 10 and FIG. 4 shows how such removal allows the platen 12 to extend substantially all the way into the corner region, its extent being limited by the geometric relation of the circle of the platen 12 to the orthogonal intersection of the walls 24 and 26. It is to be noted that the present invention is not limited to use with a sander having a circular platen, but is also applicable where the platen is rectangular or some other shape.

Figure 6:
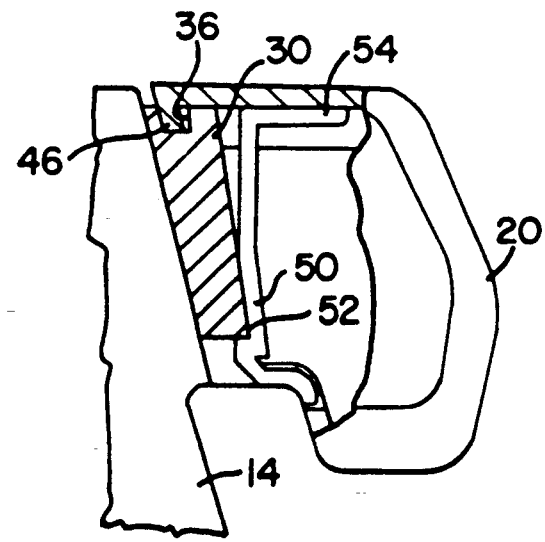
FIG. 6 is a partially sectioned side view of the auxiliary handle mounted on the main housing portion of the sander.
Figure 7:
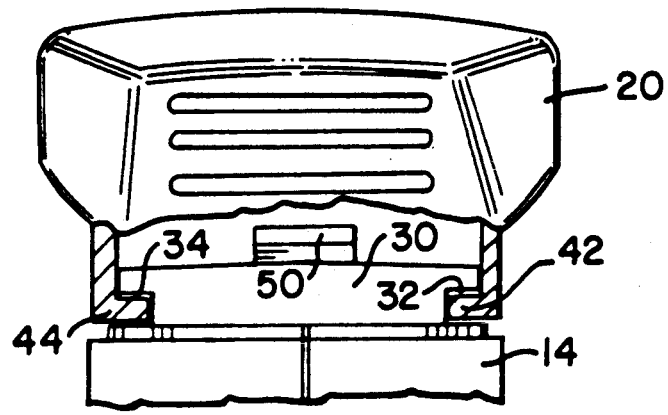
FIG. 7 is a partially sectioned top view of the auxiliary handle mounted on the main housing portion of the sander.

As shown in FIG. 3, the top forward region of the main housing portion 14 is so formed as to allow for easy removal/installation of the auxiliary handle 20. Thus, a plate member 30 is spaced from the main housing portion 14 so as to provide a pair of parallel and oppositely directed grooves 32 and 34, as well as a groove 36 orthogonal to and joining the grooves 32 and 34. To cooperate with the grooves 32, 34 and 36, the auxiliary handle 20 is formed with flanges 42, 44 and 46. Thus, to install the auxiliary handle 20 onto the sander 10, the flanges 42 and 44 are inserted in the grooves 32 and 34, respectively, and the auxiliary handle 20 is slid downwardly until the flange 46 bottoms out in the groove 36. To insure that the auxiliary handle 20 does not inadvertently slip out of place while the operator is using the sander 10, the auxiliary handle 20 is provided with a resilient latch finger 50 having a ledge 52 which catches the bottom edge of the plate member 30 when the auxiliary handle 20 is moved downwardly as far as it can go. To release the auxiliary handle 20, the operator merely puts a finger under the auxiliary handle 20 and moves the latch finger 50 to the right, as viewed in FIG. 6, to displace the ledge 52 away from the bottom edge of the plate member 30, and then the auxiliary handle 20 may be raised and removed.

Preferably, the auxiliary handle 20 is formed of three separate plastic pieces. Two of the pieces are preferably mirror images of each other and together form the body of the auxiliary handle 20. The third piece is the resilient latch finger 50 which is captured at its upper end 54 within appropriately sized and shaped recesses in the body parts. The assembly is then preferably ultrasonically welded together to form a unitary auxiliary handle 20. It is apparent from FIG. 1, which shows the auxiliary handle 20 installed on the sander 10, that the auxiliary handle 20 blends in with the overall contour of the sander 10 to provide an aesthetically pleasing appearance.

Accordingly, there has been disclosed an improved sander having a removable auxiliary handle. While a preferred embodiment has been disclosed, it is understood that other embodiments may be devised by those skilled in the art and it is only intended that the present invention be limited by the scope of the appended claims.

We claim:

1. A sander comprising:
   a movable platen adapted to support a sheet of abrasive material;
   a main housing portion above said platen and adapted to contain a motor coupled to move said platen;
   a main handle portion extending from said main housing portion rearwardly beyond said platen; and
   an auxiliary handle removably secured to said main housing portion and extending forwardly beyond said platen;
   said main housing portion being formed with a pair of parallel and oppositely directed grooves and said auxiliary handle being formed with a pair of parallel flanges adapted to each slide in a respective one of said grooves.

2. The sander according to claim 1 wherein said auxiliary handle is so shaped that it blends into and forms a part of the overall exterior contour of said sander.

3. The sander according to claim 1 wherein said main housing portion is formed with a flat plate member forwardly of and parallel to said grooves and said auxiliary handle includes means for resiliently engaging said plate member when said flanges slide a predetermined distance along said grooves.

4. The sander according to claim 3 wherein said auxiliary handle is formed of three pieces secured together, two of said pieces being mirror images of each other and together forming the body of the auxiliary handle and the third piece being a resilient latch finger forming said resiliently engaging means, said third piece being captured between said two pieces.

5. The sander according to claim 4 wherein said three auxiliary handle pieces are formed of plastic and are ultrasonically welded together.

6. The sander according to claim 1 wherein said main housing portion is formed with a third groove orthogonal to and joining said pair of parallel grooves at an upper end thereof and said auxiliary handle is formed with a third flange orthogonal to and joining said pair of flanges at an upper end thereof, said third flange adapted to seat within said third groove so as to provide a stop for the sliding of said pair of flanges along said pair of grooves.

7. The sander according to claim 6 wherein said auxiliary handle further includes means for resiliently engaging said main housing portion when said third flange is seated within said third groove.

* * * * *